(12) United States Patent
Grinberg et al.

(10) Patent No.: US 8,788,820 B2
(45) Date of Patent: *Jul. 22, 2014

(54) SECURE NETWORK ACCESS

(75) Inventors: Alexander Grinberg, Sydney (AU); Mike Kontorovich, Sydney (AU); Mark Chazan, Sydney (AU); Colin Reyburn, Sydney (AU)

(73) Assignee: Ewise Systems Pty Ltd, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,893

(22) Filed: Jun. 12, 2012

(65) Prior Publication Data

US 2013/0198514 A1    Aug. 1, 2013

Related U.S. Application Data

(63) Continuation of application No. 10/468,186, filed as application No. PCT/AU02/00150 on Feb. 14, 2002, now Pat. No. 8,200,966.

(30) Foreign Application Priority Data

Feb. 15, 2001    (AU) ..................................... 21225/01

(51) Int. Cl.
    *H04L 9/32*    (2006.01)
(52) U.S. Cl.
    USPC ................... 713/168; 726/2; 726/12; 726/14; 380/258
(58) Field of Classification Search
    CPC .......... H04L 63/0428; H04L 9/08; H04L 9/32
    USPC .................................. 380/258; 726/2, 12, 14
    See application file for complete search history.

(56) References Cited

U.S. PATENT DOCUMENTS

| | | |
|---|---|---|
| 5,235,642 A | 8/1993 | Wobber et al. |
| 5,265,164 A | 11/1993 | Matyas et al. |
| 5,642,419 A | 6/1997 | Rosen |

(Continued)

FOREIGN PATENT DOCUMENTS

| | | |
|---|---|---|
| EP | 0580350 | 1/1994 |
| EP | 0717339 B1 | 4/2002 |

(Continued)

OTHER PUBLICATIONS

Web Page: Gator® eWALLET. The Smart Online Companion; Gator Advertising and Information Network www.microsoft.com/Windows98/usingwindows/work/articles/903Mar/Autocomplete.asp.

(Continued)

*Primary Examiner* — Farid Homayounmehr
*Assistant Examiner* — Lizbeth Torres-Diaz
(74) *Attorney, Agent, or Firm* — Seyfarth Shaw LLP

(57) ABSTRACT

The present invention relates to a system and method for facilitating access to secure network sites, such as sites providing secure financial information. An active software agent is utilized to fetch passwords and user identifiers from a user computing system and to use the passwords and identifiers to extract required information from the secure site. The password sites and identifiers are encrypted and an encryption key is stored at a network mode remote from the user's computer and is fetched in order to enable the passwords and identifiers to be decrypted so that the active agent can use them to obtain the required information.

12 Claims, 3 Drawing Sheets

(56) References Cited

U.S. PATENT DOCUMENTS

| | | | |
|---|---|---|---|
| 5,655,077 | A | 8/1997 | Jones et al. |
| 5,745,574 | A * | 4/1998 | Muftic .................. 713/157 |
| 5,799,086 | A | 8/1998 | Sudia |
| 5,818,936 | A | 10/1998 | Mashayekhi |
| 5,892,824 | A | 4/1999 | Beatson et al. |
| 5,903,882 | A | 5/1999 | Asay et al. |
| 6,006,333 | A | 12/1999 | Nielsen |
| 6,044,155 | A | 3/2000 | Thomlinson et al. |
| 6,141,750 | A | 10/2000 | Micali |
| 6,182,229 | B1 | 1/2001 | Nielsen |
| 6,336,186 | B1 | 1/2002 | Dyksterhouse et al. |
| 6,539,093 | B1 | 3/2003 | Asad et al. |
| 6,643,774 | B1 | 11/2003 | McGarvey |
| 6,834,112 | B1 * | 12/2004 | Brickell ................ 380/279 |
| 6,853,988 | B1 | 2/2005 | Dickinson et al. |
| 6,859,878 | B1 * | 2/2005 | Kerr et al. ............. 713/183 |
| 7,093,020 | B1 | 8/2006 | McCarty et al. |
| 7,187,771 | B1 | 3/2007 | Dickinson et al. |
| 7,191,447 | B1 | 3/2007 | Ellis et al. |
| 7,260,724 | B1 | 8/2007 | Dickinson et al. |
| 7,343,486 | B1 | 3/2008 | McCarty et al. |
| 7,356,833 | B2 | 4/2008 | Byrne |
| 7,391,865 | B2 | 6/2008 | Orsini et al. |
| 7,448,040 | B2 | 11/2008 | Ellis et al. |
| 7,493,402 | B2 | 2/2009 | McCarty et al. |
| 7,499,551 | B1 * | 3/2009 | Mire ..................... 380/279 |
| 7,577,621 | B2 | 8/2009 | Dickinson et al. |
| 2001/0020228 | A1 | 9/2001 | Cantu et al. |
| 2002/0029269 | A1 | 3/2002 | McCarty et al. |
| 2002/0108057 | A1 | 8/2002 | Zhanhong Wu et al. |
| 2004/0049687 | A1 | 3/2004 | Orsini et al. |
| 2004/0193921 | A1 | 9/2004 | Byrne |
| 2005/0102244 | A1 | 5/2005 | Dickinson et al. |
| 2007/0067444 | A1 | 3/2007 | McCarty et al. |
| 2007/0174847 | A1 | 7/2007 | Ellis et al. |
| 2008/0034209 | A1 | 2/2008 | Dickinson et al. |
| 2008/0244277 | A1 | 10/2008 | Orsini et al. |
| 2009/0037991 | A1 | 2/2009 | Ellis et al. |
| 2010/0104101 | A1 | 4/2010 | Dickinson et al. |
| 2010/0332963 | A1 | 12/2010 | Ellis et al. |

FOREIGN PATENT DOCUMENTS

| | | |
|---|---|---|
| EP | 1197827 A2 | 4/2002 |
| JP | A-08-263417 | 10/1996 |
| JP | A-11-296490 | 10/1999 |
| WO | WO 01/52023 | 7/2001 |
| WO | WO 01/95072 | 12/2001 |
| WO | WO 02/13016 | 2/2002 |
| WO | WO 02/39294 | 5/2002 |

OTHER PUBLICATIONS

"Microsoft® Computer Dictionary, Fifth Edition," Microsoft Corporation, Microsoft Press May 1, 2002, ISBN-10: 0-7356-1495-4, ISBN-13: 978-0-7356-1495-6, total pp. 656.

* cited by examiner

SECURE NETWORK ACCESS

This application is a continuation of U.S. Ser. No. 10/468,186, filed Mar. 8, 2004, now U.S. Pat. No. 8,200,966, which is a National Phase application of PCT AU02/00150, filed Feb. 14, 2002, which claims priority to Australian Patent Application No. 21225/01, filed Feb. 15, 2001, the contents of which are herein incorporated by reference in their entirety.

FIELD OF THE INVENTION

The present invention relates to a system and method for facilitating access to secure network sites and, particularly, but not exclusively, to a system and method for facilitating access directly by a user to a plurality of secure network sites and extracting information and/or data held by the network sites.

BACKGROUND OF THE INVENTION

The use of secure network sites to provide private information to users is becoming more prevalent. Secure network sites are available for providing information on financial markets, private financial information (status of bank accounts) and many others. To obtain access to a secure network site a user usually requires some form of secure access means, such as a unique user identifier and a password, in order to enable them to access the network site services.

A user may require access to many different network sites providing different services. For example, they may have a number of bank accounts, as well as requiring access to other sites providing private information or, for example, providing information for a price. In these circumstances, the user may require many different access means, e.g. many different passwords. Remembering so many different passwords is a problem. To assist, the user may record the passwords in a "safe place". This leads to a security problem, as an unauthorised user (e.g. a "hacker") may be able to access the recorded secure access means and obtain entry to the users secure network sites.

In an attempt to address this problem, it is known to provide third party account aggregation services. An account aggregator stores, at a secure site remote from the user network node, the users secure access means for entry to the secure network sites that the user subscribes to. The user is provided with a single further secure access means for access to the account aggregator site (e.g. a single user identifier and password). The user can request the account aggregator to access the users network services and the account aggregator employs the stored user secure access means to do so on the users behalf.

There are a number of problems associated with such third party account aggregation services. Perhaps the major problem is that many institutions who run private network access sites, e.g. financial institutions such as banks, require that a user be the only person who uses the secure access means for entry to their sites. This is a legal requirement addressed in the terms and conditions of use, and the use of a third party account aggregator service having this information can breach this legal requirement. A number of institutions in Australia have in fact already taken action to block access to their secure sites by third party account aggregators.

Another problem is that the aggregator sites are desirable sites for hackers and other unauthorised persons. They store the secure access means for many users and if security can be breached, the rewards to the hacker can be great (access to many users secure network services). Security of sites is therefore a major problem and cost.

There is a need for a system which enables a user to access a plurality of secure network sites without requiring a plurality of separate secure access means, while maintaining security and control of the secure access means by the user.

It is to be understood that, if any prior art publication or reference to prior art is made herein, such reference does not constitute an admission that the prior art forms a part of the common general knowledge in the art, in Australia or any other country.

SUMMARY OF THE INVENTION

The present invention, in at least a preferred embodiment, provides a system and method which enables a user requiring access to a plurality of secure network sites, to institute queries to the plurality of secure network access sites using a single secure access means, the queries being initiated from a user computing system and not from any third party aggregator system.

In accordance with a first aspect of the present invention, there is provided a system for facilitating access by a user to a secure network site, the system including an active agent arranged to access the network site on behalf of the user, the active agent being arranged, in response to a user query, to obtain access means for enabling access to the secure site, and to utilise the access means to extract private information from the secure network sites.

Preferably, the active agent is arranged to obtain the user access means from a user access means depository.

The user access means depository is preferably accessible only by way of the user computing system and is preferably stored on the user computing system. The active agent must therefore access the user access means via the user computing system. Preferably, instigation of queries to obtain information from secure network sites is therefore totally at the behest and control of the user. Preferably, no third party controls the process.

Preferably, the system facilitates access by a user to a plurality of secure network sites.

The active agent is preferably a software agent. Preferably, the system includes a plurality of active agents. A particular active agent may be associated with a particular secure network site. Preferably, the active agents include security authorisation means, authorising them for access to a particular network site. Preferably, agent authorisation means are provided for the user system for checking the security authorisation means of the active agent. Active agents are preferably "published" and available on the network for use by users. Preferably, owners of secure network sites authorise active agents for access to their secure network sites.

Preferably, the user access means depository is a secure depository.

The user access means are preferably stored in the secure depository in an encrypted form. Preferably, a decryption key for decrypting the encrypted secure access means is stored in a decryption key repository. The decryption key repository is preferably only available from a further secure network site preferably being remote from the user system. The user is preferably provided with further access means in order to enable them to access the further secure network sites to obtain the decryption key. The decryption key can subsequently be used to decrypt the encrypted access means stored in the secure depository, so that they can be used by the active agent(s) to access the secure network site(s) and obtain the information required by the user.

This system has the advantage that the user needs only one access means (the further access means for accessing the decryption key repository) in order to access a plurality of secure network sites. The active agents, once activated, obtain the decrypted secure access means from the secure depository and access the secure network sites on the users behalf. All this is at the initiation of and under the control of the user, not a third party aggregator. Legal problems and liability problems and security problems are therefore avoided.

In the preferred embodiment, as discussed above, the active agent is arranged to obtain the access means from elsewhere, in this case a user access means depository. In an alternative embodiment, however, the active agent may already be provided with the user access means.

In accordance with a second aspect, the present invention provides a method of facilitating access to secure network sites, comprising the steps of utilising an active agent to obtain user access means and utilise the secure access means to obtain content from the secure network access site.

In accordance with a third aspect of the present invention, there is provided a security authorisation means arranged to authorise an active agent for access to a particular secure network site, the active agent being arranged to access the network site on behalf of a user, and being arranged, in response to a user query, to obtain access means for enabling access to the secure site, and to utilise the access means to extract private information from the secure network site.

The security authorisation means is preferably a software security authorisation means, and may be a tool such as a digital certificate or any other security identifier.

In accordance with a fourth aspect of the present invention, there is provided a system for facilitating access by a user to a secure network site, the system comprising a decryption key repository which is accessible by a user system via the network to enable the user system to obtain a decryption key associated with the user, the decryption key being able to decrypt encrypted user access means so that they can be used to access secure sites.

Preferably, an active agent is used to access the secure sites with the access means, as discussed above in relation to the first aspect of the present invention.

In accordance with a fifth aspect of the present invention, there is provided a computer program arranged, when loaded into a computing system, to control the computing system to provide an active agent arranged to access network sites on behalf of a user, the active agent being arranged, in response to a user query, to obtain access means for enabling access to the secure site, and to utilise the access means to extract private information from the secure network site.

In accordance with a sixth aspect of the present invention, there is provided a registration system for facilitating registration to a system for facilitating access by a user to a secure network site, the system for facilitating access by a user to a secure network site including an active agent arranged to access the network site on behalf of the user, the active agent being arranged, in response to a user query, to obtain access means for enabling access to the secure site, and to utilise the access means to extract private information from the secure network site, the registrations system including a directory listing active agents that a user may obtain access to.

Preferably, the registration system includes a means for providing a decryption key to be associated with a user being registered, the decryption key being arranged to decrypt encrypted access means for access to secure network sites.

In accordance with a seventh aspect of the present invention, there is provided an agent provider sit for providing an active agent arranged to access a secure network site on behalf of a user, the active agent being arranged, in response to a user query, to obtain access means for enabling access to the secure site, and to utilise the access means to extract private information from the secure site, the provider site including an active agent repository storing an active agent for access by the user system.

Preferably, an agent provider site may provide a plurality of active agents from the repository, each of the active agents being arranged to access a corresponding secure network site.

In accordance with an eighth aspect of the present invention, there is provided a user system for facilitating access to secure network sites, the user system including an active agent engine, arranged to execute an active agent on behalf of the suer, the active agent being arranged to access a network site on behalf of the user and, in response to a user query, to obtain access means for enabling access to the secure site and to utilise the access means to extract private information from the secure network site.

Preferably, the active agent engine is arranged to obtain the access means.

Preferably, the user system also includes a presentation manager arranged to present the private information extracted by the active agent.

In accordance with a ninth aspect of the present invention, there is provided a method of operating a system for facilitating access by a user to a secure network site, the system including an active agent arranged to access the network site on behalf of the user, the active agent being arranged, in response to a user query, to obtain access means for enabling access to the secure site and to utilise the access means to extract private information from the secure network site, the method comprising the steps of making the active agent available at a first network node remote from a user system, and providing the active agent to the user system in response to a user request.

The method preferably includes the further steps of making a decryption key for decrypting user access means in encrypted form, available at a further network node remote from the user system and active agent repository, and providing the decryption key to the user system on request by the user, whereby the decryption key can be used to decrypt the access means so that the access means can be used by the active agent to access the secure network site.

BRIEF DESCRIPTION OF DRAWINGS

Features and advantages of the present invention will become apparent from the following description of an embodiment thereof, by way of example only, with reference to the accompanying drawings, in which.

DESCRIPTION OF BEST EMBODIMENT

The preferred embodiment of the present invention as described in the following include components that are operable on computer systems and may be implemented by software or hardware or a combination of software or hardware. It will be appreciated that there may be many ways in which the functionality of the following components may be implemented by a skilled software/hardware person. All ways of implementing the functionality of the components fall within the scope of the present invention.

Figure 1:
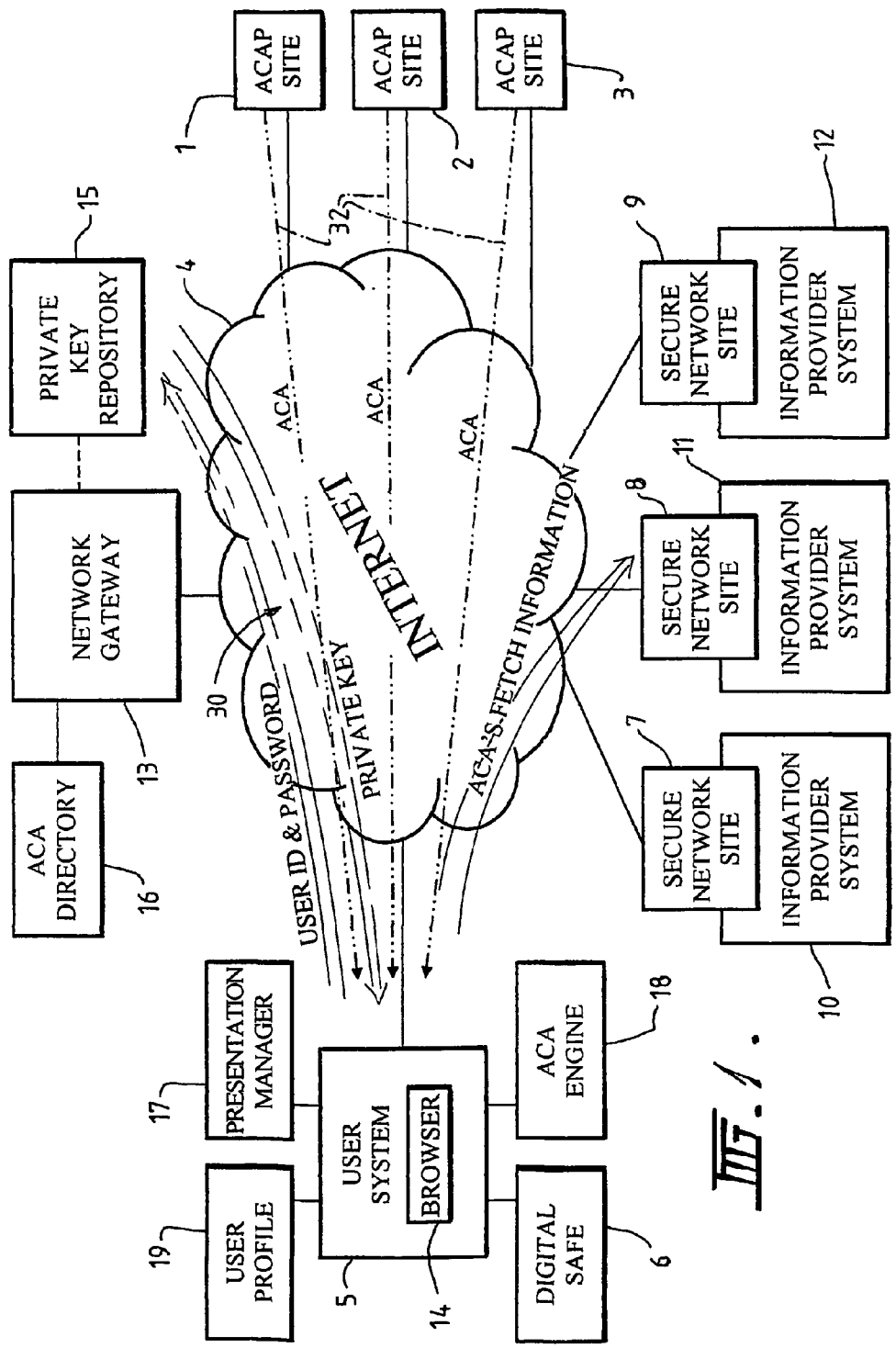
FIG. 1 is a schematic block diagram of a system in accordance with an embodiment of the present invention.

FIG. 1 is a block diagram illustrating implementation of a system in accordance with an embodiment of the present invention.

The system provides for a plurality of active agents, in this embodiment known as active content agents (ACAs). In this embodiment the ACAs are available from an active content agent provider (ACAP) site, reference numerals 1, 2 and 3, of which there may be any number. The ACAP sites are preferably Web sites which may be operated by suitably programmed computing systems (not shown) connected to the Internet 4. ACAs from the ACAP sites are obtained by a user system 5. The user system may be any computing system which is able to access a network such as the Internet 5. It may be a personal computer, for example, or a local area network, or any other configuration of computing system. Note that only one user system 5 is shown in the FIG. 1 diagram, but it will be appreciated that there may be many user systems 5 that can operate in accordance with the system of the present invention.

The user system stores a plurality of user access means in a digital safe 6. The user access means may include passwords and user IDs for access to secure network sites, reference numeral 7, 8, 9, operated by information provider systems 10, 11, 12 having access to the Internet 4. Note that there may be any number of secure network sites and ACAP sites and three are shown in FIG. 1 for purposes of illustration and example only. Further, the secure access means may be any means which enables access via a secure channel to the secure network site and may include a password, digital certificate PIN, finger print, or any other type of key.

The ACAs are configured to be able to take the secure access means and utilise the secure access means to access the particular secure network site which the ACA is configured for. Information from the secure site is brought back to the user system by the ACA.

The system will now be described in more detail. Firstly, operation of the system to enable registration of a user with the system will be described, then operation to obtain information from secure network sites will be described in detail.

System Set Up and Registration

ACAs are published by ACA providers and made available on the network. An ACA must be verified as secure. If it is not, it is unlikely that information providers will allow ACAs to have access to their secure network sites. In many cases, in fact, an information provider may also be an ACA provider. In order to ensure security, the ACAP applies for and receives a digital certificate verifying the ACAPs identity from a Network Membership Authority (not shown). The Network Membership Authority may be accessible via the network 4. The ACA is developed and the digital certificate issued by the network authority is attached, and the ACA is then published on the network ACAP site. A digital certificate is merely one form of security authorisation means. It will be appreciated that any form of security authorisation means may be utilised. The Network Membership Authority may earn revenue for providing the authorisation to the ACAs.

To register with the system, a user accesses a network gateway 13 (which will be supported by a network system, not shown) using a suitable access program such as a browser 14. The user provides standard registration information, such as address, security information, etc. For security purposes, it may even be sometimes necessary for a user to attend manually an office and provide identification information, such as passport or driving license.

Once the registration information has been provided, the user receives a unique private key which is subsequently stored in a private key repository 15, accessible via the network gateway 13. The user can then access and select from the list of ACAs offered by the network gateway. The search for available ACAs may be performed using an active content agent directory 16. The user will select ACAs which are associated with the secure network sites e.g. bank account sites, which he wishes to access. Subsequently, the users are prompted to enter their user identifiers and account passwords (i.e. their secure access information for the secure network sites they are associated with) to be stored in their digital safe 6.

Figure 3:
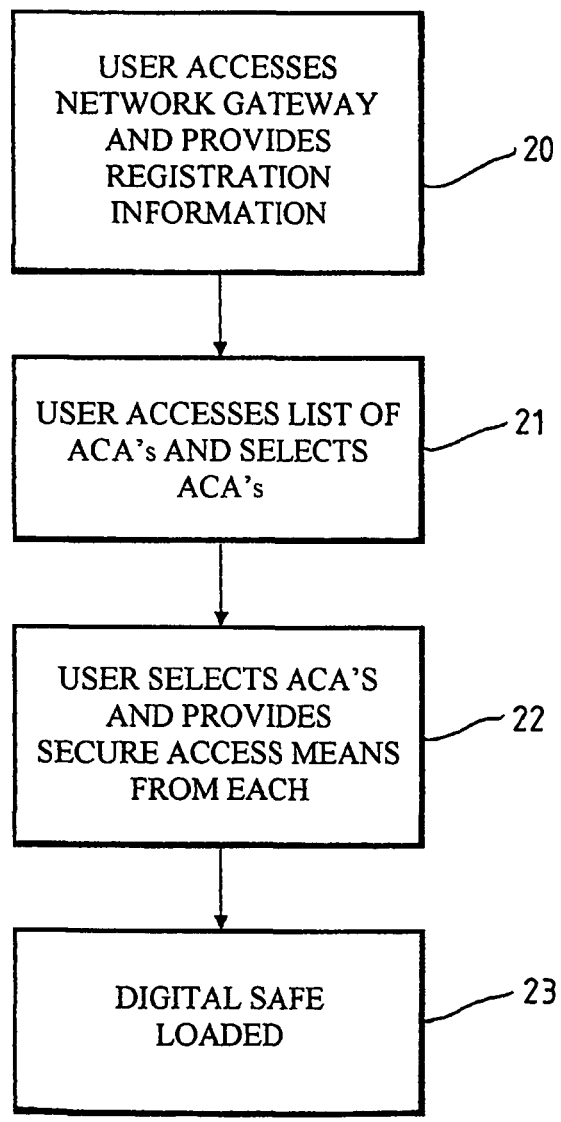
FIG. 3 is a flow diagram illustrating steps in the operation of a registration process to register to use the system of FIG. 1.

This registration process is summarised in the flow chart of FIG. 3. At step 20, the user accesses the network gateway and provides their registration information.

At step 21, the user accesses the list of the ACAs and selects the ACAs for their secure network sites.

At step 22, the user provides the secure access means (password and user identification, for example) for each of the ACAs.

At step 23, the digital safe is loaded with the secure access means.

The user is also provided with some software modules for use on the user system. These include a presentation manager 17 which is arranged to present information retrieved by ACAs. It also includes an ACA engine 18 which is arranged to authorise ACAs (by checking their digital certificates) and execute ACAs. The user profile 19 is also, in this embodiment stored on the user system 5. It may be, alternatively, stored on the network gateway 13 or at another remote site.

Operation of System

Figure 2:
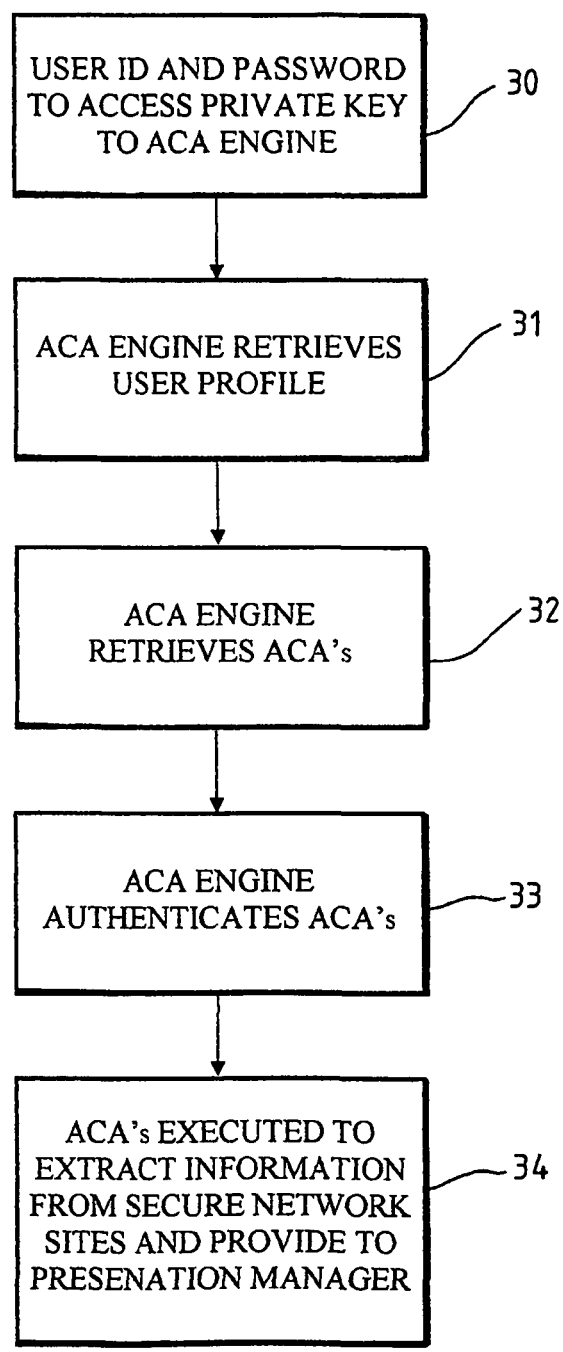
FIG. 2 is a flow diagram showing steps in the operation of obtaining information from secure network sites utilising a system of the embodiment of FIG. 1.

Operation of the system to obtain information from secure network sites for users will now be described. FIG. 2 summarises the steps in operation of the system.

A user wishing to obtain information, e.g. financial information, details of their bank accounts, or other private information, from secure network sites 7, 8 and 9 first of all accesses the network gateway 13 to securely access the private key repository 15. The user identifier and password which is entered via the network gateway and the ACA engine running on the user system 5 receives the private key from the private key repository 15 (step 30 of FIG. 2).

Note that the user identifiers and account passwords (access means) stored in the digital safe are stored in an encrypted manner. The private key is able to decrypt the access means stored in the digital safe, in order to enable the agents to subsequently use the decrypted access means to obtain access to the secure network sites 7, 8, 9. Because the private key is kept in the private key repository 15 at a location remote from the user system 5, even if a hacker manages to break into the user system and the digital safe, they will not be able to decrypt the user access means. All the users secure information is therefore safe, even though it is all kept in one place on the user system.

The ACA engine 18 receives the users private key and uses it to decrypt the information in the digital safe, when it is executing the ACAs. Once the ACA engine 18 has decrypted the required access means, the users private key is discarded from the user system. The users private key therefore does not remain on the user system and any hacker attempting to obtain the access means of the user will not be able to decrypt the access means because they will not have the private key.

Once the private key has been retrieved by the ACA engine, the ACA engine retrieves the user profile 19 (step 31). The ACA engine 18 then retrieves the ACAs from the addresses/ URLs specified in the user profile, of the ACAP sites 1, 2, 3 (step 32).

The ACA engine subsequently authenticates the ACAs by utilising the digital certificates associated with each ACA, to ensure that the ACAs are the ACAs provided for access to the secure network sites 7, 8, 9 (step 33).

Each ACA retrieved is then executed by the ACA engine to extract information from the secure network sites 7, 8, 9 and provide that information for presentation to the user via the presentation manager 17 (step 34).

The ACA automates the process of accessing the information providers network mode, accessing, for example, the users accounts held by the information provider, using the users account access means stored in their digital safe, and communicating the extracted information to the presentation manager 17. The presentation manager 17 is able to display the extracted information to the user. Internet based information provider services, such as on-line banking, can be accessed by the ACA and user specific information extracted such as account balances.

The ACA in the preferred embodiment will be in the form of a software agent. The ACA may present multiple forms of user authentication, depending upon its programming. For example, it could present SmartCard, digital certificate, biometric and any other forms of authentication. Further, because the ACA is software which can be built by a ACAP, it can be arranged to allow the user to automate the access process to the site and the information provided from the site, through automated presentation and applicable user authentication of attributes and instructions. An ACA, because of its flexibility, is capable of replicating all actions which a site may require a user to perform as part of the user authentication process. This could include any authentication process, e.g. automated random mouse movement.

ACA pre-defined actions may include accessing the target website, navigating the target website and authenticating the user to the target site, navigating the site to identify user-specific information, such as bank account balances and presenting information to the user in a summary form, as well as any other pre-defined actions that can be programmed.

Additionally, for example, the ACA may perform a number of pre-defined transactions on the target site including e.g. electronic bill payment and electronic funds transfer. The ACA is capable of being programmed to automate, on behalf of an authenticated user any and all transactional functions supported by the target site.

The ACA may therefore, perform multiple tasks, depending on programming, because it is an agent.

In a preferred embodiment, where a plurality of ACAs have access to a plurality of secure network sites 7, 8, 9, the presentation manager is able to display the information in summary form on a single screen. The presentation manager 17 may be utilised by the user to vary the form in which the information is presented.

Further, in a preferred embodiment, links are provided by the presentation manager directly to the secure network sites e.g. hyper-linking via HTML. For example, a user may execute a bank ACA. The current details of their accounts with that bank will be displayed via the presentation manager 17, and the user will be able to click on the bank link and be taken directly into their bank account accessible on the network. This is done without leaving the system of the present invention, so that the user can link back to the summary page and link to other sites without having to provide further secure access information to log on again to the other sites.

The following paragraphs summarise the components of the system of the present invention.

1. A Private Key Provider is a Network node allowing secure access to a Private Key Repository to a Network user.
2. A Private Key Repository is a database kept by the Private Key Provider which is capable of storing the Network users' private keys.
3. A Network user authentication mechanism is maintained by the Private Key Provider to provide secure user authentication prior to the release of the private key from the Private Key Repository to a user.
4. An Active Content Agent Provider is authorised by the Network Membership Authority to publish Active Content Agents on the Network by providing security verification and identification, such as digital certificates.
5. Active Content Agent software program capable of accessing an Information Provider Network node and extracting information, such as a user's account balance and other account date. For user data protected through unique user identifiers and passwords by the Information Provider, an ACA is capable of extracting the relevant account access data from the user's Digital Safe and presenting it to the Information Provider for user authentication. An ACA is capable of making the data extracted from the Information Provider available to the ACA Presentation Manager and enables automated access to the Information Provider network node by the user. The presented results may have links which allow the user to connect directly to the Information Provider's Network node. An ACA is capable of being authenticated by the ACA Engine as being published by an authorised Active Content agent Provider, using techniques such as digital signatures.
6. Information Provider is an organisation for which one or more ACAs have been published by authorised ACA Providers. An ACA Provider can be an Information Provider.
7. A Network Gateway is a Network access point for a user which provides access to other nodes on the Network and/or perform functions of other Network nodes. A Network Gateway can provide and maintain a User Profile Repository.
8. An Active Content Agent Directory which provides a searchable list and/or search engine to locate Active Content agents published on the Network.
9. Network Membership Authority authorises access to the Network for Active Content Agent Providers and Network Gateways through provision and control of authentication mechanisms, such as digital certificates.
10. Network Access Authentication mechanism, such as digital certificate or user ID password, etc.

In the above embodiment, the network that is used to implement the system is the Internet. It will be appreciated that this system may operate on any network, being an Intranet, local area network, or any other type.

In the embodiment described above, the user seeks to access a plurality of secure network sites using a plurality of active agents. It is possible that one active agent may have the functionality to access a number of active sites, rather than having an active agent for each site. Further, a user may require access to only a single secure network site. This is particularly useful in the case where the access means is rather complex (some secure sites require passwords which are very long and very difficult to remember). In such a case it is still useful to have the facility of the present invention utilising an active agent to access the secure site.

In the above-described embodiment, access is via a user computing system such as a PC. The user computing system may be any type of computing device, however, including, but not limited to, a personal digital assistant (PDA), mobile phone or other mobile device, digital or interactive television set-type box or SmartCard device.

A digital safe may be any entity (software and/or hardware) that can store the user access means. In the simplest terms, it may merely be a memory are where the user access means are stored, preferably in encrypted form. In the above-described embodiment, the digital safe is stored on the user computer. It may not be. It may stored elsewhere, as long as access is obtainable by way of the user computer.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The claims defining the invention are as follows:

1. A system for facilitating access by a user to a secure network site, the system comprising:
   a user computing system including an active agent engine that executes an active agent from a remote computing device to access the secure network site on behalf of the user, the active agent being arranged, in response to a user query, to:
   retrieve a dedicated decryption key from a repository server remote from the user computing system;
   utilize the retrieved decryption key to obtain access data for enabling access to the secure network site, the access data being obtained from an encrypted vault stored on the user computing system; and
   utilize the access data to extract information from the secure network site for presentation to the user.

2. The system in accordance with claim 1, wherein the active agent includes a security authorization module that authorizes the active agent for use with the user computing system.

3. The system in accordance with claim 2, wherein the user computing system includes an authorization engine for checking the security authorization module.

4. The system in accordance with claim 1, wherein the encrypted vault stores respective encrypted access data for a plurality of secure network sites.

5. The system in accordance with claim 1, wherein the access data is accessible only via the user computing system.

6. The system in accordance with claim 1, including a plurality of active agents for respectively accessing a plurality of independent secure network sites.

7. The system in accordance with claim 1, further comprising an active agent repository server remote from the user computing system, the active agent being available from the active agent repository server.

8. The system in accordance with claim 1, further comprising a decryption key repository server which is accessible by the active agent via a network to enable the active agent to obtain a dedicated decryption key associated with a user, the decryption key being arranged to decrypt encrypted access data.

9. The system in accordance with claim 1, wherein the active agent is adapted to discard the decryption key from the user computing system once the access data is obtained.

10. A method of facilitating access to secure network sites on behalf of a user utilizing a user computing system including an active agent engine executing an active agent from a remote computing device, the method comprising:
    retrieving a decryption key from a repository server remote from the user computing system in response to a user query;
    utilizing the retrieved decryption key to obtain access data for enabling access to a secure network site, the access data being obtained from an encrypted vault stored on the user computing system; and
    utilizing the access data to extract private information from the secure network site for presentation to the user.

11. The method according to claim 10, further comprising discarding the decryption key once the access data is obtained.

12. The method in accordance with claim 10, further comprising authorizing the active agent for use with the system using an active agent security authorization module.

* * * * *